(12) United States Patent
Lee et al.

(10) Patent No.: US 8,997,771 B2
(45) Date of Patent: Apr. 7, 2015

(54) INTEGRATED PRESSURE CONTROL ACTUATOR ASSEMBLY OF HYDROGEN SUPPLY SYSTEM

(75) Inventors: Hyun Joon Lee, Gyeonggi-do (KR); Yong Gyu Noh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 896 days.

(21) Appl. No.: 12/284,322

(22) Filed: Sep. 19, 2008

(65) Prior Publication Data
US 2009/0032756 A1 Feb. 5, 2009

(30) Foreign Application Priority Data
Jun. 26, 2008 (KR) .................. 10-2008-0060970

(51) Int. Cl.
*F16K 1/00* (2006.01)
*G05D 16/20* (2006.01)
*H01M 8/04* (2006.01)

(52) U.S. Cl.
CPC ......... *G05D 16/208* (2013.01); *H01M 8/04089* (2013.01); *H01M 8/04388* (2013.01); *H01M 8/04686* (2013.01); *H01M 8/04753* (2013.01); *H01M 2250/20* (2013.01); *Y02E 60/50* (2013.01); *Y02T 90/32* (2013.01)

(58) Field of Classification Search
USPC .................. 137/625.4, 605–606, 870, 625.28, 137/625.33, 883, 1
See application file for complete search history.

(56) References Cited

U.S. PATENT DOCUMENTS

| | | | | |
|---|---|---|---|---|
| 4,802,507 A | * | 2/1989 | Willson | 137/613 |
| 5,358,177 A | * | 10/1994 | Cashmore | 137/606 |
| 5,762,086 A | * | 6/1998 | Ollivier | 137/613 |
| 6,374,166 B1 | * | 4/2002 | Takeda | 429/423 |
| 6,832,628 B2 | * | 12/2004 | Thordarson et al. | 137/613 |
| 6,889,706 B2 | * | 5/2005 | Fukano et al. | 137/613 |
| 6,957,663 B2 | * | 10/2005 | Hirota et al. | 137/613 |
| 2007/0193637 A1 | * | 8/2007 | Cantin et al. | 137/606 |
| 2007/0194261 A1 | * | 8/2007 | Kato et al. | 251/129.15 |

FOREIGN PATENT DOCUMENTS

| | | |
|---|---|---|
| JP | 2004-185831 | 7/2004 |
| JP | 2008-041265 | 2/2008 |
| KR | 10-2002-0054831 | 7/2002 |
| KR | 10-2004-0003575 A | 1/2004 |
| KR | 10-0805447 | 2/2008 |

* cited by examiner

*Primary Examiner* — Christopher Kim
(74) *Attorney, Agent, or Firm* — Mintz Levin Cohn Ferris Glovsky and Popeo, P.C.; Peter F. Corless

(57) ABSTRACT

An integrated pressure control actuator assembly of a hydrogen supply system includes: a start/stop solenoid valve, a bypass valve, and a pressure control actuator, which are integrally formed in a single body; a normal flow path formed on the body, through which hydrogen gas is transferred from the start/stop solenoid valve to the pressure control actuator; an auxiliary flow path formed on the body, through which hydrogen gas is transferred according to opening and closing of the bypass valve connected to the normal flow path; and a control means for controlling the opening and closing of the bypass valve by detecting a failure of the pressure control actuator. The assembly enables the fuel cell vehicle to be driven in a limp home mode in the event of an emergency by adjustment of the pressure of hydrogen.

9 Claims, 7 Drawing Sheets

INTEGRATED PRESSURE CONTROL ACTUATOR ASSEMBLY OF HYDROGEN SUPPLY SYSTEM

CROSS-REFERENCE TO RELATED APPLICATION

This application claims under 35 U.S.C. §119(a) the benefit of Korean Patent Application No. 10-2008-0060970 filed Jun. 26, 2008, the entire contents of which are incorporated herein by reference.

BACKGROUND (a) Technical Field

The present invention relates to a pressure control actuator (PCA) assembly of a hydrogen supply system in a fuel cell vehicle. More particularly, the present invention relates to an integrated pressure control actuator assembly of a hydrogen supply system in a fuel cell vehicle, which allows the fuel cell vehicle to be driven in a limp home mode in the event of an emergency by adjustment of the pressure of hydrogen.

(b) Background Art

A fuel cell vehicle is driven by electrical energy generated by an electrochemical reaction between hydrogen as a fuel and oxygen in the air in a fuel cell stack of the vehicle. Since the fuel hydrogen has a large volume in a gaseous state, methods of storing hydrogen in the form of a high-pressure gas, a liquid hydrogen, or a metal hydride have been studied. According to a method of storing high-pressure hydrogen gas in a high-pressure hydrogen tank at 350 bar or 700 bar, since the high-pressure hydrogen gas cannot be directly supplied to the fuel cell stack, the pressure of hydrogen gas is reduced so as to supply hydrogen gas at low pressure (generally, below 1 bar) to the fuel cell stack.

FIG. 1 shows a conventional hydrogen supply system of a fuel cell vehicle, which reduces the pressure of high-pressure hydrogen gas and supplies hydrogen gas under reduced pressure to a fuel cell stack. In the hydrogen supply system, the pressure of hydrogen is reduced in two steps.

More specifically, as shown in FIG. 1, hydrogen gas at high pressure (350 or 700 bar) supplied from a fuel storage tank transported to a high-pressure regulator. The high-pressure regulator reduces the pressure of hydrogen to 5 to 20 bar. The reduced pressure hydrogen is then sent to a low-pressure regulator connected to a start/stop solenoid valve for supplying hydrogen gas or cutting off the supply (refer to reference numeral 10 in the figure). The low-pressure regulator reduces the pressure of the hydrogen to a pressure that allows supply of the hydrogen gas to the fuel cell stack (e.g., 1 bar or lower).

The hydrogen gas transported from the low-pressure regulator is supplied to the fuel cell stack through an ejector and reacts with oxygen in the air supplied to the fuel cell stack, thus generating electrical energy.

In this case, the hydrogen gas that does not participate in the reaction with oxygen is recirculated to the fuel cell stack through a recirculation blower and the hydrogen gas that is not recirculated is discharged to the outside through a purge solenoid valve of a hydrogen discharge system.

The conventional hydrogen supply system, however, has drawbacks. More particularly, the low-pressure regulator of the system controls the pressure of hydrogen by movement of upper and lower springs while atmospheric pressure is maintained in a reference pressure space. It thus supplies hydrogen gas passively and cannot actively increase the supply amount of hydrogen. To increase the supply amount, a separate hydrogen recirculation system is required. Moreover, when water is accumulated in a fuel electrode (anode), it cannot discharge the water by forcibly increasing the supply amount of hydrogen gas or the pressure of hydrogen gas.

FIG. 2 is a graph showing a change in hydrogen supply pressure according to an output of the conventional hydrogen supply system including the low-pressure regulator. It can be seen from FIG. 2 that the pressure of a fuel electrode (anode) showing the supply pressure of hydrogen passing through the low-pressure regulator is reduced as the output of the fuel cell stack is increased. Accordingly, in the low-pressure regulator, the higher the output of the fuel cell stack, i.e., the higher the flow amount of hydrogen gas, the lower the hydrogen supply pressure. With the decrease in the hydrogen supply pressure, the pressure unbalance between the fuel electrode and an air electrode (cathode) is caused, thereby increasing the amount of hydrogen crossover during idle and decreasing the performance of the fuel cell stack in the event of high load.

Moreover, as shown in FIG. 3, in the conventional hydrogen supply system including the low-pressure regulator, since a start/stop solenoid valve 20 and the lower pressure regulator 30 are connected to each other through a pipe 40, a number of leakage points (not shown) occur in the system, resulting in leakage of hydrogen.

In another conventional hydrogen supply system, a pressure control actuator is used instead of the low-pressure regulator. While the low-pressure regulator, as discussed above, supplies hydrogen gas passively and cannot actively increase the supply amount of hydrogen, the pressure control actuator can actively control flow and pressure as well.

The system including the pressure control actuator, however, has problems in that, in the event that a failure occurs in the pressure control actuator, the supply of hydrogen gas is cut off to stop the vehicle operation, which may result in a serious accident and that in the event that the fuel cell system is shut down due to the fuel cut, none of alternative way to make the vehicle continue to be operated is not provided.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, the present invention provides an integrated pressure control actuator assembly of a hydrogen supply system for use in a fuel cell system for a vehicle, which can stably supply hydrogen gas through the pressure control actuator and can operate the vehicle in a limp home mode in the event of a failure of the pressure control actuator.

In one aspect, the present invention provides an integrated pressure control actuator assembly of a hydrogen supply system for use in a fuel cell system for a vehicle. The integrated pressure control actuator assembly comprises: a pressure control actuator formed on a body, which actively controls pressure and flow of hydrogen gas; and a bypass valve formed on the body, which becomes open in the event of a failure of the pressure control actuator so as to enable hydrogen to flow toward a fuel stack of the vehicle.

Another aspect of the present invention provides an integrated pressure control actuator assembly, comprising: a start/stop solenoid valve, a bypass valve, and a pressure control actuator, which are integrally formed in a single body; a normal flow path formed on the body, through which hydrogen gas is transferred from the start/stop solenoid valve to the pressure control actuator; an auxiliary flow path formed on the body, through which hydrogen gas is transferred according to opening and closing of the bypass valve connected to the normal flow path; and a control means for controlling the opening and closing of the bypass valve by detecting a failure of the pressure control actuator.

In a further aspect, the present invention provides a method of controlling the above-described integrated pressure control actuator assemblies. The method comprise the steps of: determining a value (Error) by subtracting a stack inlet pressure (Pstat) supplied through the pressure control actuator from a target pressure (Ptarg) according to a load; comparing the value (Error) with a predetermined reference value (Error-1); and operating the bypass valve, if the reference values (Error-1) is greater than the value (Error).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
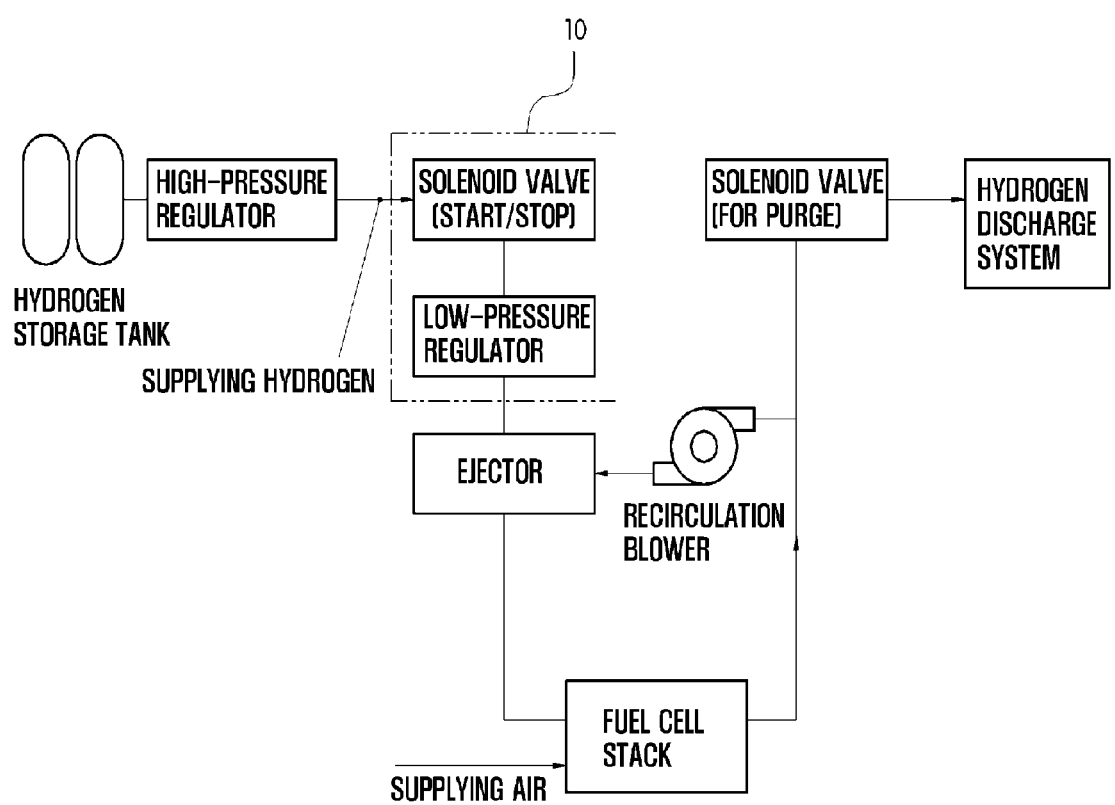
FIG. 1 is a configuration diagram of a conventional hydrogen supply system.
Figure 2:
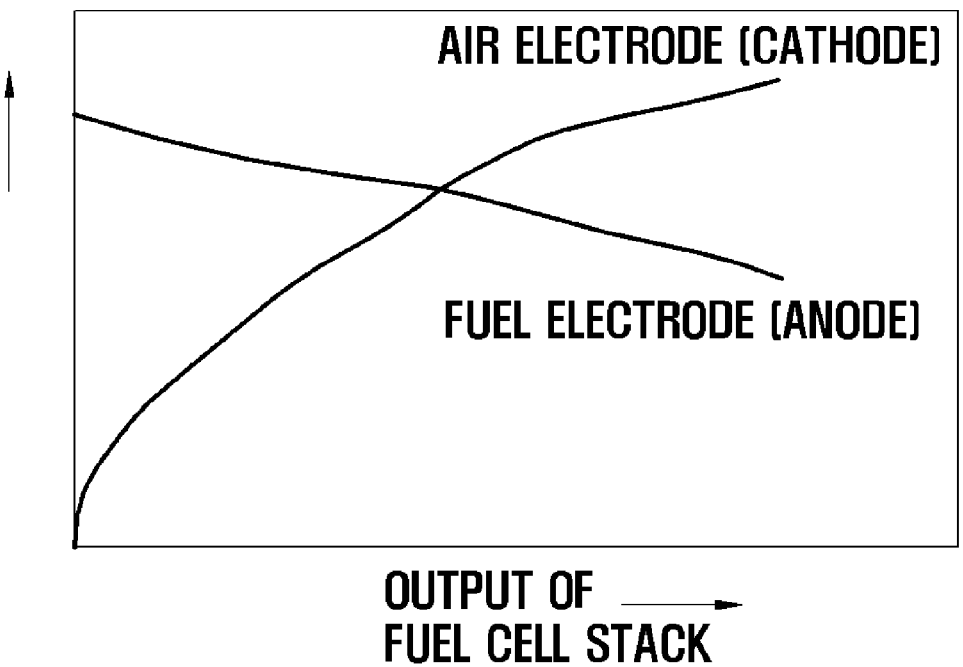
FIG. 2 is a graph showing a change in hydrogen supply pressure according to an output of a fuel cell stack by the conventional low-pressure regulator.
Figure 3:
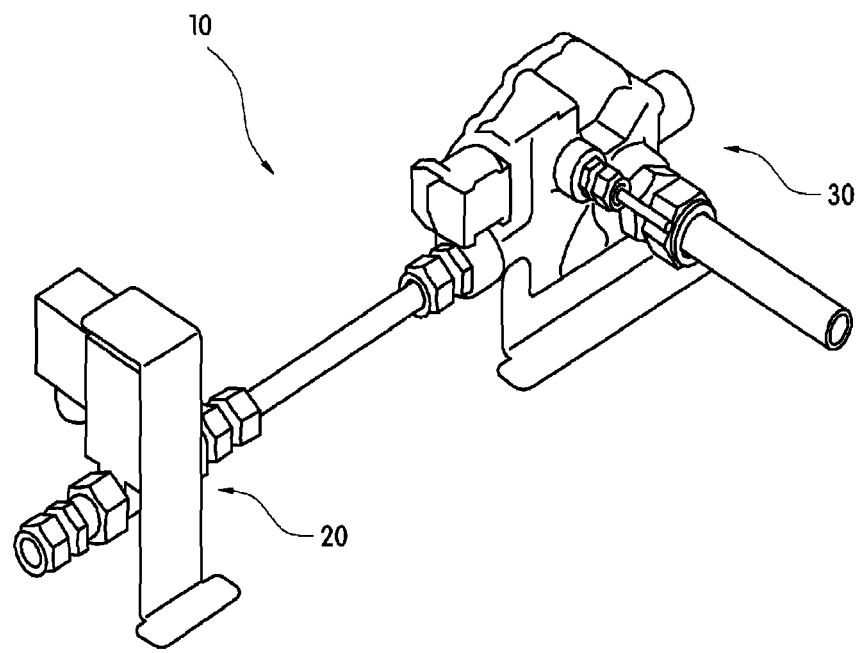
FIG. 3 is a perspective view showing the conventional hydrogen supply system in which a start/stop solenoid valve and a low-pressure regulator are included.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an integrated pressure control actuator assembly, which secondly reduces the pressure of hydrogen gas supplied from a hydrogen storage tank, which is first reduced to 5 to 20 bar by a high-pressure regulator, so as to supply the hydrogen gas under reduced pressure to a fuel cell stack. The integrated pressure control actuator assembly of the present invention includes a pressure control actuator (PCA) capable of actively controlling pressure and flow of hydrogen gas and provides a limp home mode performed by a bypass valve in the event of a failure of the pressure control actuator.

Figure 4:
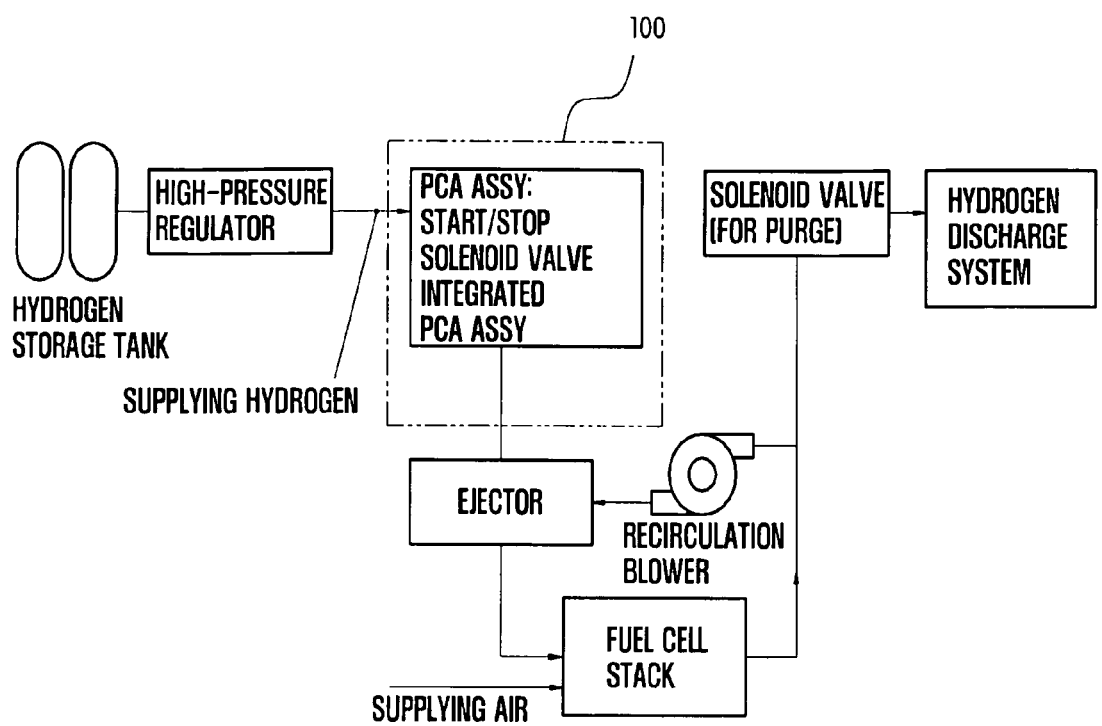
FIG. 4 is a configuration diagram of a hydrogen supply system in accordance with an embodiment of the present invention.

FIG. 4 shows a hydrogen supply system including an integrated pressure control actuator assembly in accordance with an embodiment of the present invention.

As shown in FIG. 4, in the hydrogen supply system, the hydrogen gas stored in a storage tank is sent to a high-pressure regulator, which reduces the pressure of hydrogen (approximately, 350 bar or 700 bar) to 5 to 20 bar. The hydrogen gas under reduced pressure is then sent to the integrated pressure actuator assembly 100, which reduces the hydrogen gas pressure to a pressure (generally, below 1 bar) capable of being supplied to the fuel cell stack.

The hydrogen gas, of which pressure is reduced by the integrated pressure control actuator assembly, is supplied to the fuel cell stack through an ejector and reacts with oxygen in the air supplied to the fuel cell stack, thus generating electrical energy.

The hydrogen gas that does not participate in the reaction in the fuel cell stack is recirculated to the fuel cell stack through a recirculation blower and the hydrogen gas that is not recirculated is discharged to the outside through a purge solenoid valve of a hydrogen discharge system.

Figure 5:
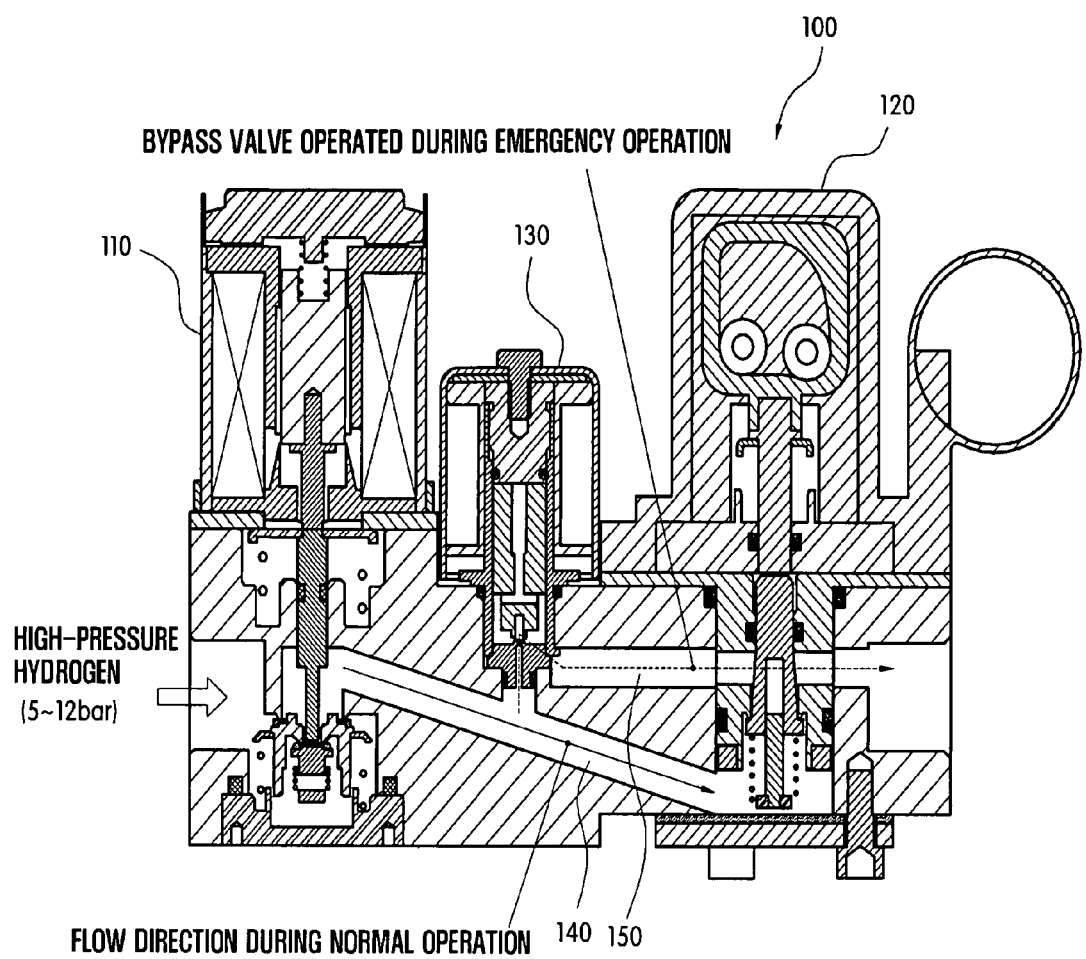
FIG. 5 is a cross-sectional view of an integrated pressure control actuator assembly in accordance with an embodiment of the present invention.

FIG. 5 shows a cross-section of an integrated pressure control actuator assembly 100 according to an embodiment of the present invention.

As shown in FIG. 5, the integrated pressure control actuator assembly 100 has a structure in which a start/stop solenoid valve 110, a bypass valve 130, and a pressure control actuator 120 are integrated in a body. The body includes a normal flow path 140, through which hydrogen gas supplied from the start/stop solenoid valve 110 flows in a normal operation mode, and an auxiliary flow path 150, through which hydrogen gas supplied from the bypass valve 130 flows in a limp home mode.

The hydrogen gas supplied from the hydrogen storage tank, of which pressure is first reduced to 5 to 20 bar by the high-pressure regulator, is supplied to the integrated pressure control actuator assembly 100 as the start/stop solenoid valve 110 is operated.

The start/stop solenoid valve 110 performs a function of simply supplying hydrogen gas or cutting off the supply of hydrogen gas through an on/off control. Moreover, the start/stop solenoid valve 110 is typically a normally closed (NC) valve which is closed in the event of a power failure so that hydrogen gas is not supplied.

When the hydrogen gas, of which pressure is first reduced, is supplied as the start/stop solenoid valve 110 is opened, the hydrogen gas flows through the normal flow path 140 formed on the body. In this case, since the bypass valve 130 is also a normally closed valve, the auxiliary flow path 150 is always closed in a normal mode, and the flow of hydrogen gas is made through the normal flow path 140.

The hydrogen gas flowing through the normal flow path 140 in the normal mode is transferred to the pressure control actuator 120. The pressure control actuator 120 is a device that regulates the opening degree by linearly controlling a stem and supplies hydrogen gas in a desired amount and under a desired pressure by controlling the pressure and flow of hydrogen gas. Accordingly, the pressure control actuator 120 is configured such that the flow and pressure of the supplied hydrogen gas can be controlled by precisely controlling the stem through a motor and a gear box. The hydrogen gas supplied through the pressure control actuator 120 is supplied to the fuel cell stack through the ejector.

The pressure control actuator 120 is also a normally closed valve that operates in the same manner as the other valves such that the power supply is cut off in the event of a failure of a critical component such as the stem of the pressure control actuator 120 and thereby the valve is closed.

The integrated pressure control actuator assembly 100 includes the bypass valve 130 connected to the auxiliary flow path 150 capable of stably supplying a predetermined amount of hydrogen gas in the event of an emergency so that the vehicle operation is not stopped in the case where the hydrogen gas is not supplied to the fuel cell stack due to a failure of the pressure control actuator 120.

The bypass valve 130 is also a normally closed valve. That is, it is closed in the normal mode. Unlike the pressure control actuator 120, however, in the event of a failure of the pressure control actuator 120, the bypass valve 130 is supplied with electrical power to be opened such that hydrogen gas of a predetermined flow and pressure is transferred through the auxiliary flow path 150. The bypass valve 130 is connected to a middle portion of the normal flow path 140 so as to open and close the flow of hydrogen gas to the auxiliary path 150 formed on the body. The hydrogen gas transferred through a portion of the normal flow path 140 when the bypass valve 130 is opened is transferred to the auxiliary flow path 150 through the opened bypass valve 130 and then supplied to the fuel cell stack through the ejector. The auxiliary flow path 150 connected to the bypass valve 130 is formed on the body on which the normal flow path 140 is formed, and connected to the ejector through a flow path separated from the normal flow path 140.

The bypass valve 130 is formed to perform the on/off control in the same manner as the start/stop solenoid valve 110. The flow and pressure of hydrogen gas passing through the bypass valve 130 are determined by a bypass solenoid force generated when electrical power is supplied and the size of an orifice formed in the bypass valve 130. Accordingly, it is possible to supply hydrogen gas of a predetermined flow and pressure to the fuel cell stack through the bypass valve 130 in the event of a failure of the pressure control actuator 120, thus providing a limp home mode in which the fuel cell vehicle can move a predetermined distance in the event of an emergency.

Although not shown in FIG. 5, preferably, a control means for controlling the integrated pressure control actuator assembly 100 may be provided. The control means controls the opening and closing of the start/stop solenoid valve 110 and the opening degree of the pressure control actuator 120. Also suitably, the control means may include a failure detection means to detect a failure of the pressure control actuator 120 and. In the event of a failure of the pressure control actuator 120, it may control the opening and closing of the bypass valve 130 to supply hydrogen gas through the auxiliary flow path 150. The failure detection means may be a pressure sensor that measures the pressure of hydrogen gas supplied from the pressure control actuator 120 to the fuel cell stack.

The control means (not shown) closes the bypass valve 130 during normal operation to cut off the electrical power of the bypass valve 130 so that the hydrogen gas is not supplied through the auxiliary flow path 150.

However, in the event that a failure of the pressure control actuator 120 is detected and thereby the pressure control actuator 120 is closed, the control means opens the bypass valve 130 by supplying electrical power to the bypass valve 130 so that hydrogen gas can be supplied through the auxiliary flow path 150.

Moreover, the control means may open the bypass valve 130 together with the pressure control actuator 120 in a case where a high power exceeding a predetermined maximum flow of the pressure control actuator 120 is required. Accordingly, it is possible to supply fuel containing the hydrogen gas transferred to the pressure control actuator 120 through the normal flow path 140 and the hydrogen gas transferred to the auxiliary flow path 150 through the bypass valve 130 to the fuel cell stack, thus increasing the output of the fuel cell stack.

Figure 6:
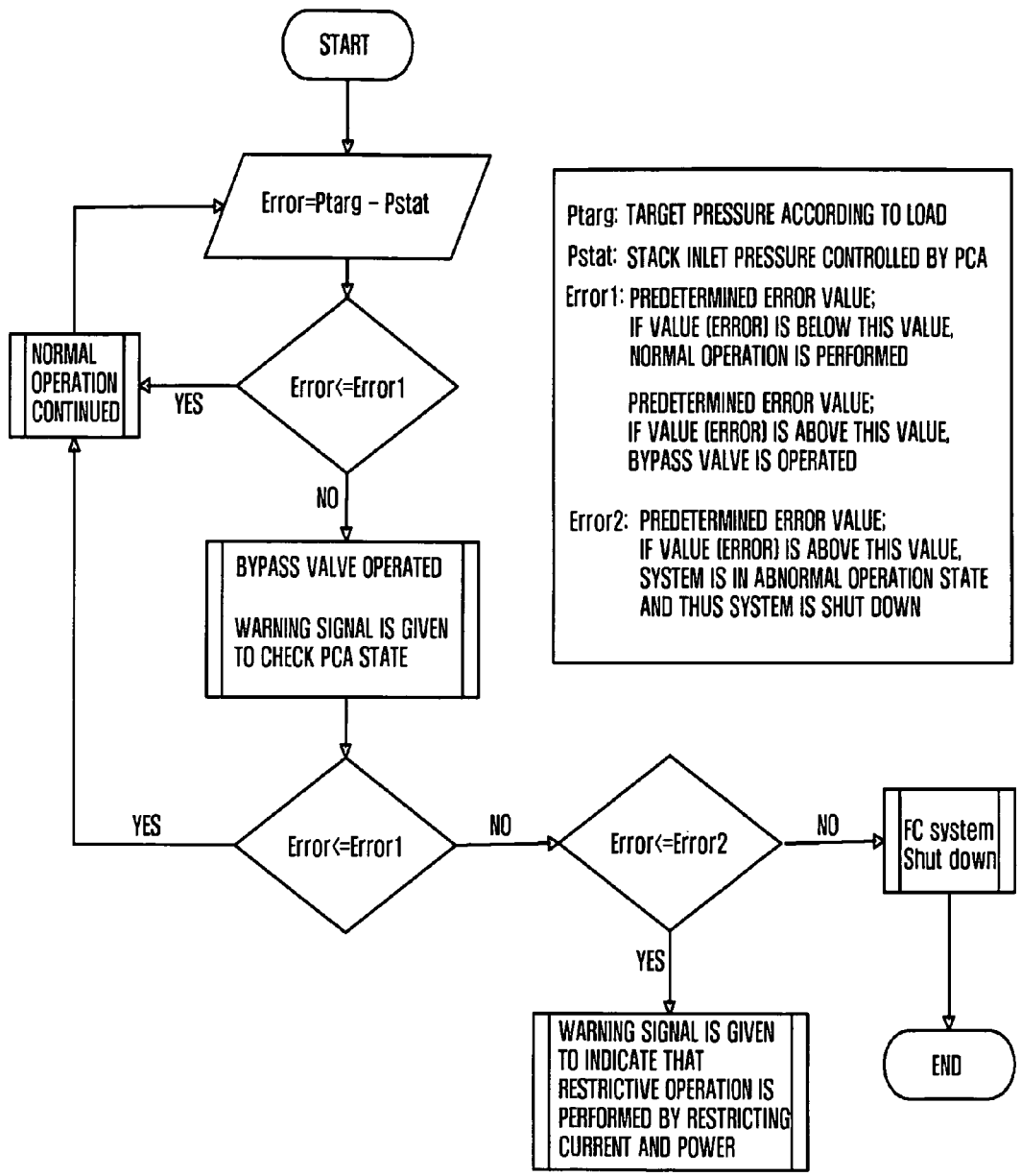
FIG. 6 is a flowchart showing a control process performed by a control means of the integrated pressure control actuator assembly in accordance with an embodiment of the present invention.

FIG. 6 is a flowchart showing a control process performed by the control means in the event of a failure of the pressure control actuator in accordance with an embodiment of the present invention.

As shown in FIG. 6, a value (Error) is calculated by subtracting a stack inlet pressure (Pstat) supplied through the pressure control actuator from a target pressure (Ptarg) according to a load. The thus calculated value (Error) is compared with a predetermined reference value (Error-1). If the value (Error) is equal to or smaller than the reference value (Error-1), the normal operation is continued. Otherwise, the bypass valve is operated and a warning signal is given to check the state of the pressure control actuator.

After the bypass valve is operated, the value (Error) is compared again with the reference value (Error-1). If the value (Error) is equal to or smaller than the reference value (Error-1), the normal operation is continued. If the value (Error) is greater than the reference value (Error-1), the value (Error) is compared with another predetermined reference value (Error-2), which is greater than the reference value (Error-1). If the reference value (Error-2) is greater than or equal to the value (Error), a limp home mode is initiated by restricting the current and power of the integrated pressure control actuator assembly. If the value (Error) is greater than the reference value (Error-2), the fuel cell system is shut down.

Figure 7:
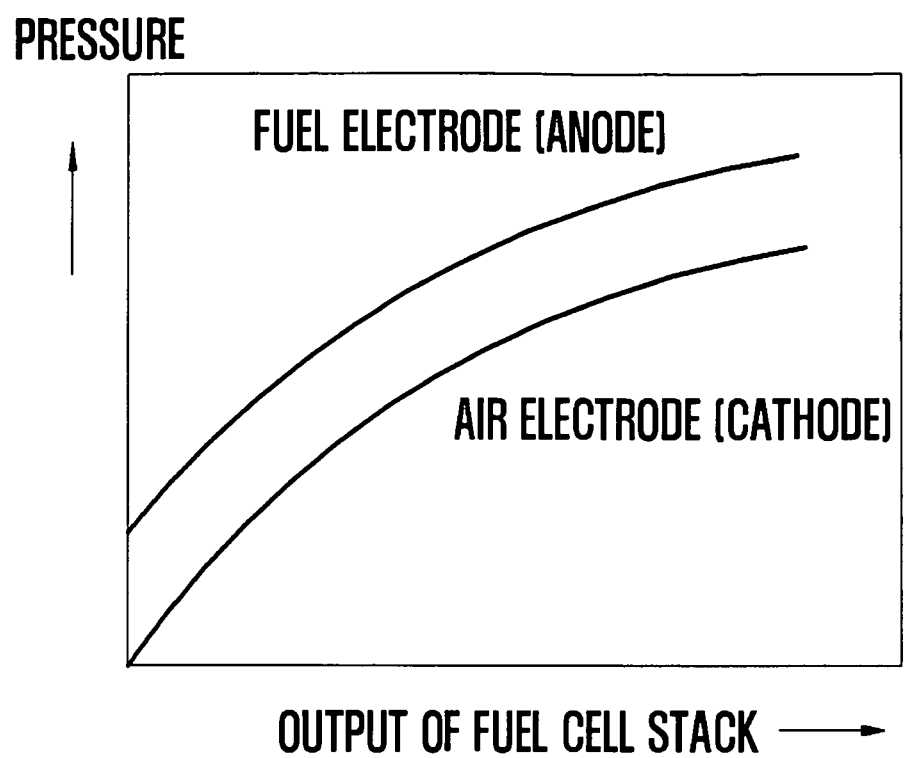
FIG. 7 is a graph showing a change in hydrogen supply pressure according to an output of a fuel cell stack by the integrated pressure control actuator assembly in accordance an embodiment of with the present invention.

FIG. 7 is a graph showing a change in hydrogen supply pressure according to an output of the fuel cell stack by the integrated pressure control actuator assembly in accordance with an embodiment of the present invention.

As shown in FIG. 7, it can be understood that the present hydrogen supply systems can maintain the pressure difference between a fuel electrode and an air electrode with respect to the change in the output of the fuel cell stack since the pressure and flow of hydrogen gas can be actively controlled by the pressure control actuator. Accordingly, the amount of hydrogen crossover is reduced, the performance of the fuel cell stack is improved, and the durability of a membrane in the fuel cell system is improved.

As described above, the integrated pressure control actuator assembly of the hydrogen supply system in accordance with the present invention has the advantages including the following. First, since the pressure control actuator is used instead of the conventional low-pressure regulator, it is possible to prevent temporary flooding at the fuel electrode, and thus it is possible to prevent the fuel cell system from being deteriorated. Second, since the pressure balance between the fuel electrode and the air electrode is achieved, it is possible to increase the durability of the membrane in the fuel cell system, reduce the amount of hydrogen crossover, and improve the performance of the fuel cell stack. Third, with the bypass valve, it is possible to provide a limp home mode in the event of a failure of the pressure control actuator, and thus the stability is improved. Lastly, with the integrated structure in which the valves are provided on the single body and the flow paths are formed thereon, it is possible to prevent hydrogen leakage, reduce the volume of the system and reduce the manufacturing cost.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An integrated pressure control actuator assembly of a hydrogen supply system in a fuel cell system of a vehicle, the integrated pressure control actuator assembly comprising:
   a start/stop solenoid valve, a bypass valve, and a pressure control actuator, which are integrally formed in a single body;
   a normal flow path formed on the body, through which hydrogen gas is transferred from the start/stop solenoid valve to the pressure control actuator;
   an auxiliary flow path formed on the body, through which hydrogen gas is transferred according to opening and closing of the bypass valve connected to the normal flow path; and
   a control means for controlling the opening and closing of the bypass valve by detecting a failure of the pressure control actuator,
   wherein the auxiliary flow path is connected to an ejector through a flow path separated from the normal flow path, and
   wherein the bypass valve is a solenoid valve that maintains pressure and flow of hydrogen gas supplied through the auxiliary flow path by solenoid force and the size of an orifice formed in the bypass valve, and
   wherein the bypass valve is connected in the middle portion of the normal flow path in order to open and close the flow of hydrogen gas to the auxiliary flow path formed on the body,
   wherein the control means compares a difference between a target pressure according to a load and a stack inlet pressure supplied through the pressure control actuator with a predetermined reference value to detect a failure of the pressure control actuator and, if a failure is detected, opens the bypass valve so that fuel is supplied through the auxiliary flow path.

2. The integrated pressure control actuator assembly of claim 1, wherein the start/stop solenoid valve and the bypass valve are normally closed valves.

3. The integrated pressure control actuator assembly of claim 1, wherein the control means opens the bypass valve when a high power exceeding a predetermined maximum flow of the pressure control actuator is required even in a case where no failure is detected.

4. A method of controlling the integrated pressure control actuator assembly of claim 1, the method comprising:
   (a) determining a value (Error) by subtracting a stack inlet pressure (Pstat) supplied through the pressure control actuator from a target pressure (Ptarg) according to a load;
   (b) comparing the value (Error) with a predetermined reference value (Error-1);
   (c) operating the bypass valve, if the reference value (Error-1) is greater than the value (Error).

5. The method of claim 4, further comprising:
   (a) comparing the value (Error) with the reference value (Error-1) after the bypass valve is operated;
   (b) if the value (Error) is greater than the reference value (Error-1), comparing the value (Error) with another reference value (Error-2) which is greater than the reference value (Error-1); and
   (c) if the reference value (Error-2) is greater than or equal to the value (Error), initiating a limp home mode by restricting a current and power of the integrated pressure control actuator assembly, and if the value (Error) is greater than the reference value (Error-2), shutting down the fuel cell system.

6. An integrated pressure control actuator assembly of a hydrogen supply system in a fuel cell system of a vehicle, the integrated pressure control actuator assembly comprising:
   a pressure control actuator formed on a body, which actively controls pressure and flow of hydrogen gas;
   a bypass valve formed on the body, which becomes open in the event of a failure of the pressure control actuator so as to enable hydrogen to flow toward a fuel stack of the vehicle,
   a normal flow path formed on the body, through which hydrogen gas is transferred from a start/stop solenoid valve to the pressure control actuator;
   an auxiliary flow path formed on the body, through which hydrogen gas is transferred according to opening and closing of the bypass valve connected to the normal flow path,
   wherein the bypass valve is a solenoid valve that maintains pressure and flow of hydrogen gas supplied through the auxiliary flow path by solenoid force and the size of an orifice formed in the bypass valve, and
   wherein the bypass valve is connected in the middle portion of the normal flow path in order to open and close the flow of hydrogen gas to the auxiliary flow path formed on the body; and
   a control means for controlling the opening and closing of the bypass valve by detecting a failure of the pressure control actuator
   wherein the control means compares a difference between a target pressure according to a load and a stack inlet pressure supplied through the pressure control actuator with a predetermined reference value to detect a failure of the pressure control actuator and, if a failure is detected, opens the bypass valve so that fuel is supplied through the auxiliary flow path.

7. The integrated pressure control actuator assembly of claim 6, wherein the control means opens the bypass valve when a high power exceeding a predetermined maximum flow of the pressure control actuator is required even in a case where no failure is detected.

8. A method of controlling the integrated pressure control actuator assembly of claim 6, the method comprising:
   (a) determining a value (Error) by subtracting a stack inlet pressure (Pstat) supplied through the pressure control actuator from a target pressure (Ptarg) according to a load;
   (b) comparing the value (Error) with a predetermined reference value (Error-1);
   (c) operating the bypass valve, if the reference value (Error-1) is greater than the value (Error).

9. The method of claim 8, further comprising:
   (a) comparing the value (Error) with the reference value (Error-1) after the bypass valve is operated;
   (b) if the value (Error) is greater than the reference value (Error-1), comparing the value (Error) with another reference value (Error-2) which is greater than the reference value (Error-1); and
   (c) if the reference value (Error-2) is greater than or equal to the value (Error), initiating a limp home mode by restricting a current and power of the integrated pressure control actuator assembly, and if the value (Error) is greater than the reference value (Error-2), shutting down the fuel cell system.

\* \* \* \* \*